Sept. 7, 1926.
R. C. MASON
SHOCK ABSORBER
Filed Oct. 15, 1923
1,598,923
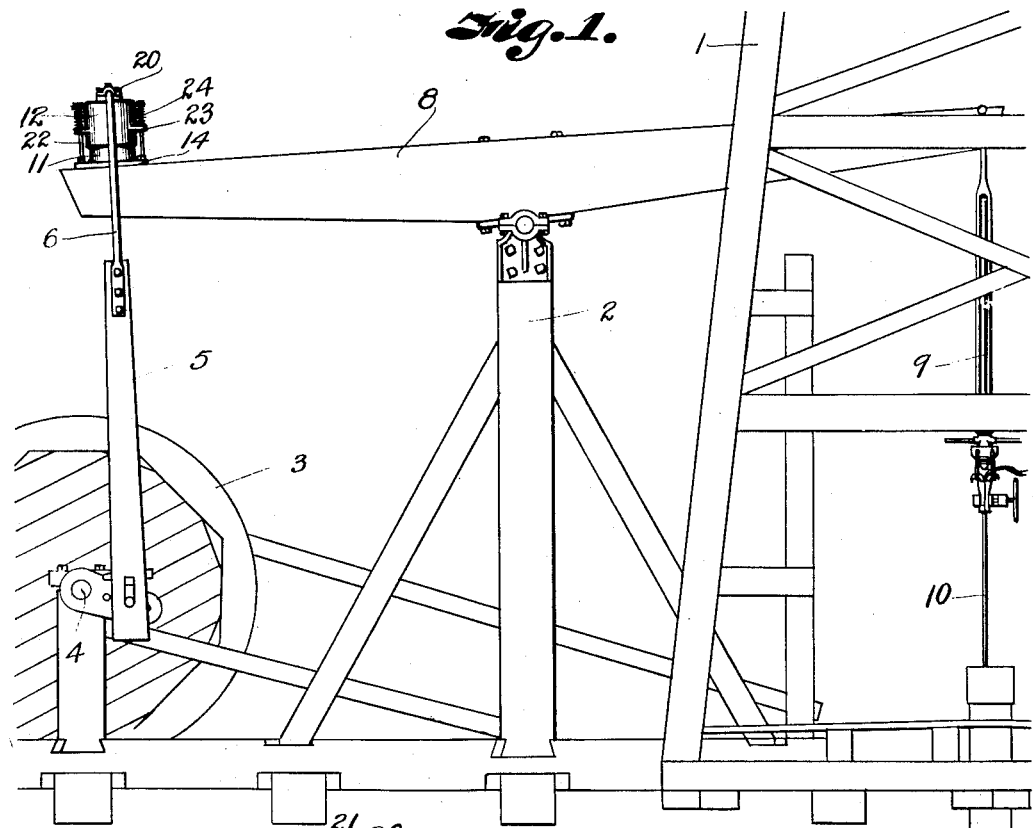
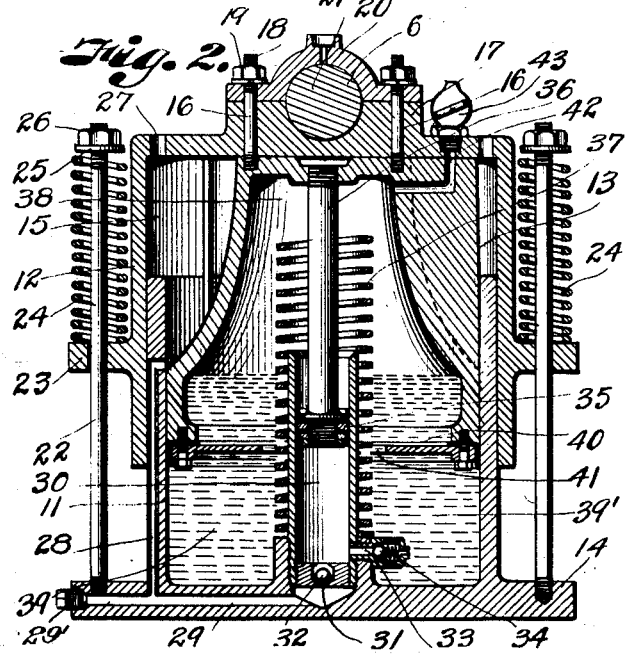
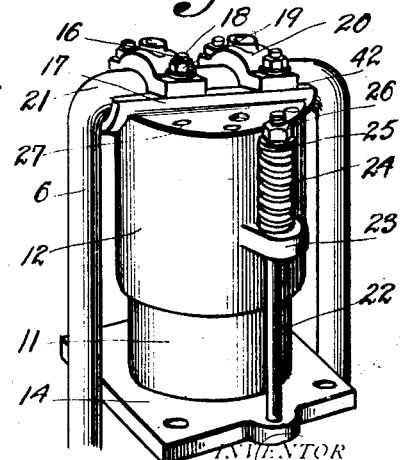
Richard C. Mason,
INVENTOR
BY
ATTORNEY Patented Sept. 7, 1926.

1,598,923

UNITED STATES PATENT OFFICE.

RICHARD C. MASON, OF TULSA, OKLAHOMA.

SHOCK ABSORBER.

Application filed October 15, 1923. Serial No. 668,559.

This invention relates to a shock absorber particularly applicable for use in connection with well drilling machinery and the primary object of the invention is to provide a device which will efficiently absorb the shocks and jars incident to the well drilling and pumping operations.

Under ordinary practice it is practically impossible to drill a well without subjecting the operating machinery to sharp shocks or blows due to the intermittent rise and fall of tools in the well which cause sharp shocks to be communicated to the moving parts. As a result of these shocks keys are sheared off, bearings pounded and a general deterioration of the well drilling machinery and especially the great damage done to the wire line results far in advance of what would be expended from ordinary wear and tear on the machinery so I have provided a novel form of shock absorber which will absorb the shocks and blows and therefore prolong the period of usefulness of the operating mechanism. The device is particularly applicable for use when the operating mechanism is used as a mud mixer as it eliminates the necessity for large strings of casing and the attendant cause, resulting from the fact that the soft formation and water that has to be carried at the top of the hole because the wire line is not springy enough to thoroughly mix the mud. Wire lines are practically a necessity because the wells are so deep that manila rope cannot be conveniently used and wire lines do not have the necessary spring so I have provided the shock absorber to give the necessary yieldability to render the mud mixing thorough and efficient.

The novel construction of the invention will be apparent by reference to the following description in connection with the accompanying drawings in which:

Fig. 1 is an elevational view of part of a well drilling rig to which my invention is applied.

Fig. 2 is an enlarged vertical sectional view through the shock absorber, and

Fig. 3 is a detailed perspective view of the shock absorber showing the stirrup attached thereto.

The derrick 1, the post 2, the band wheel 3, the crank shaft 4, the pitman 5, the stirrup 6, the walking beam 8, the temper screw 9 and the wire line or cable 10 are all standard construction and I therefore do not include this mechanism per se as part of my invention. With the ordinary construction though the stirrup 6 engages a notch in the walking beam 8 so that shocks from the cable 10 are communicated through the temper screw and walking beam to the entire operating mechanism. These shocks can be absorbed by a shock absorber following the generic principles of my invention which is interposed between the stirrup and the walking beam or between the temper screw and the walking beam. I have shown it applied to only one end of the walking beam but obviously it may be attached to either end so I do not wish to be limited to the particular position or location shown.

The shock absorber is shown as comprising a cylinder made up of three concentric cylinder walls, 11, 12 and 13 of which the wall 13 is the inner one in telescopic relation. The wall 11 is provided with a base flange 14 by means of which it may be fastened to the walking beam and its upper edge telescopes between the depending walls 12 and 13, the wall 13 being of less diameter than the wall 12 to provide a space 15 for the reception of the wall 11. The cylinder 13 may be fastened to the end of the wall 12 by stud bolts 16 which extend above the bearing head 17 on wall 12 and which have threaded ends 18 to receive nuts 19 so that the bearing cup 20 can be fastened in place to secure the shock absorber to the cross bar 21 of the stirrup 6. Carried by the base 14 of wall 11 are upstanding guide rods 22 which project through lugs 23 extending laterally from the wall of the wall 12 and resting upon the lugs 23 are coiled springs 24, the upper ends of which are adapted to contact with the washers 25, held in place by the nuts 26 so as there is relative movement between the walls 12, 13 and the wall 11. The springs will offer yielding resistance to the expansive movement of the shock absorber. The wall 12 is provided with air inlet openings 27 which admit air to the space 15 so that it can flow through the passageway 28 in the vertical wall of the wall 12 and into the duct 29 in the base 14 and thereby enter the upstanding pump cylinder 30 through the inlet port 31 adapted to be intermittently covered and uncovered by the check ball valve 32. The duct 29, to facilitate casting, is extended through the wall of the cylinder flange, but closed at its outer end by a plug 29'. The pump cylinder has an outlet port 33 adapted to be closed by a spring actuated check ball valve 34 so that when the piston 35 moves on its intake stroke and the valve 32 is unseated to admit air to the cylinder, the valve 34 will be seated and when the piston 35 moves on its compression stroke the valve 32 will be seated and the valve 34 will be unseated.

The piston 35 is provided with appropriate cup leather to make a tight seat in the cylinder 30 and it is rigidly connected to the wall 13 by a stem 36 so that when there is relative movement between the walls 12 and 13 on one end and the wall 11 on the other, the pump will operate. There is a coil spring 37 surrounding the pump cylinder and adapted to contact with the upper head carried by the wall 13, the spring 37 being an expansion spring which will expand the shock absorber for starting it when it is collapsed, that is the spring starts the shock absorber to pumping when it is down and as soon as the shock absorber has pumped a small amount of air, the shock absorber will thereby be the medium for providing the power to expand the shock absorber each time it is contracted. As soon as enough air is in the shock absorber to cause the shock absorber to re-expand each time it is contracted, the spring is automatically out of commission, therefore the spring is only used as a booster in the starting of the apparatus. A cushioning cylinder or space 38, is formed by the telescopic walls 11 and 13 into which the pump 30 discharges and the space 38 is provided with a liquid 39' to form a liquid seal for the air which may be forced from the pump. The bottom of the wall 13 is provided with a wall 40 having a central opening 41 surrounding the pump and the spring 37 and the liquid level extends above the wall 40 providing a seal for the air space 38, but the liquid itself tends to cushion the blow because when the walls are telescoped there will be a displacement of the liquid from the space below the wall 40 into the space 38 but as this displacement is governed by the rate of flow it is obvious that there will be a time element in which this displacement can take place so there will be a hydraulic cushioning effect in addition to the air cushion which will permit the shock absorber to take the blow or shock in an easy manner, it being understood of course that if the liquid is displaced from the lower chamber 39 into the upper chamber 38 the air in chamber 38 will be compressed because the liquid will constitute a liquid piston. There is a port 42 extending through the walls 12 and 13 controlled by a valve 43 so that the air can be exhausted from the chamber or space 38 whenever it is desired to destroy the effectiveness of the shock absorber.

When the parts are assembled and the crank shaft pulls down on the pitman 5 the walls 12 and 13 will be telescoped on the wall 11 moving the pump piston on its compression stroke and when the crank shaft passes over dead center the spring 37 will tend to boost the walls 12 and 13 so that the shock absorber will expand, then the pump piston will move on its intake stroke drawing air through the ports 27, the passageway 28, the duct 29 and into the pump cylinder 3, then the down stroke of the pitman 5 will cause the shock absorber to contract moving the piston 35 on its compression stroke to force air into the space 38 the valve 32 at this time being seated. This action will continue until sufficient pressure has accumulated in the shock absorber, the walls to resist the shocks and blows incident to the drilling operation or the mudding in operation, the liquid seal preventing the escape of the air between the walls 11, 12 and 13 and as above explained whenever it is desired to relieve the air pressure in space 38 the valve 32 can be opened whereupon the pressure can exhaust to atmosphere. The wall 13 is sealed with respect to the wall 11 by a cup leather 47.

I prefer to construct the wall 13 with an inner conical cavity so as to cause the air to progress quickly, due to the fact that the upper part of the wall is of less diameter than the lower part and by such a construction the air will expand quickly thus increasing the efficiency of the device over one in which the walls are of uniform diameter throughout.

It will be apparent that the device can be conveniently located upon the walking beam and that it will absorb the shocks and jars to which the machinery may be subjected so that the wear and tear on the machinery could not be so great as would be the case where no means was provided for absorbing such shocks.

It is also apparent that the device can be used by pumping wells when they are pumped on the beam. In such an event the use of the device will eliminate the breaking of the rods due to the fact that it will absorb the constant poundings of the cups on the fluid which would otherwise be communicated to the rods and tend to break them.

What I claim and desire to secure by Letters Patent is:

1. A shock absorber for oil well rigs comprising two concentric, spaced cylinder walls, the outer one having a closed end with air inlets communicating with the space between the walls, a third cylinder wall closed at one end opposite to the closed ends of the first mentioned walls, the free edge of the third cylinder being received in the space between the first two cylinder walls to provide an enclosing cylinder, the third wall having an elongated port communicating with the inlet openings, a pump cylinder carried by the closed end of the third cylinder and surrounded by the third cylinder wall in spaced relation therewith, the pump cylinder communicating with the elongated port through a valved inlet, a pump piston receiving its movement from one of the first mentioned cylinder walls and having reciprocatory movements in the pump cylinder, the pump cylinder having an outlet communicating with the space confined by the third and the inner one of the first mentioned cylinder walls, the third wall surrounding the pump cylinder but spaced therefrom, and a coil spring carried by the third cylinder adapted to contact with the inner one of the first mentioned cylinder walls.

2. A shock absorber for oil well rigs comprising two concentric spaced cylinder walls, the inner one having a closed upper end, the outer wall having air inlets communicating with the space between the walls, a third concentric wall having a closed lower end, the third wall being in the space between the first two concentric walls, the third wall having an elongated port communicating with the air inlets, a pump cylinder surrounded by the third wall communicating with the port through a valved inlet, a pump piston receiving its movement from one of the first mentioned cylinders and having reciprocatory movements in the pump cylinder, the pump cylinder having an outlet communicating with the space confined by the third wall and the inner one of the first two walls, the lower end of the third wall having an opening, the third wall being of greater diameter than the pump cylinder, and a coiled spring carried by the closed end of the third wall, adapted to contact with the inner one of the first two walls, lugs on the outer one of the first two walls, rods extending from the third wall through the lugs, and springs around the rods bearing on said lugs.

In testimony whereof I affix my signature.

RICHARD C. MASON.